US009793689B2

United States Patent
Kawamura

(10) Patent No.: US 9,793,689 B2
(45) Date of Patent: Oct. 17, 2017

(54) ELECTRIC CONNECTION BOX

(71) Applicant: Yazaki Corporation, Tokyo (JP)

(72) Inventor: Yukihiro Kawamura, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/015,753

(22) Filed: Feb. 4, 2016

(65) Prior Publication Data
US 2016/0164265 A1   Jun. 9, 2016

Related U.S. Application Data

(63) Continuation of application No. PCT/JP2014/072986, filed on Sep. 2, 2014.

(30) Foreign Application Priority Data

Sep. 6, 2013  (JP) ................ 2013-184985

(51) Int. Cl.
*H02B 1/32* (2006.01)
*B60R 16/023* (2006.01)
*H02G 3/08* (2006.01)
*H02B 1/30* (2006.01)
*H02G 3/16* (2006.01)

(52) U.S. Cl.
CPC ........... *H02B 1/32* (2013.01); *B60R 16/0238* (2013.01); *H02B 1/305* (2013.01); *H02G 3/086* (2013.01); *H02G 3/16* (2013.01)

(58) Field of Classification Search
USPC ........................................... 361/622
See application file for complete search history.

(56) References Cited

U.S. PATENT DOCUMENTS

| 1,188,236 | A | * | 6/1916 | Campbell | B68C 1/14 54/23 |
| 2,766,436 | A | * | 10/1956 | Luebking | H01R 9/24 439/722 |
| 3,633,075 | A | * | 1/1972 | Hawkins | H02B 1/21 337/196 |
| 4,063,110 | A | * | 12/1977 | Glick | H01R 13/6397 174/67 |

(Continued)

FOREIGN PATENT DOCUMENTS

| JP | 2000-92661 A | 3/2000 |
| JP | 2001-211528 A | 8/2001 |

(Continued)

OTHER PUBLICATIONS

International Search Report of PCT/JP2014/072986 dated Nov. 18, 2014.

(Continued)

*Primary Examiner* — Timothy Thompson
*Assistant Examiner* — Krystal Robinson
(74) *Attorney, Agent, or Firm* — Sughrue Mion, PLLC

(57) ABSTRACT

An electric connection box includes a frame, a lower cover that covers the lower surface of the frame, and at least one block that is attached in the frame and disposed at a position along a peripheral wall of the frame. An electric wire that is connected to a component attached to the block out of the blocks is drawn horizontally from the block toward inside the frame.

10 Claims, 5 Drawing Sheets

(56) References Cited

U.S. PATENT DOCUMENTS

| | | | | |
|---|---|---|---|---|
| 4,266,266 | A * | 5/1981 | Sanner | H02B 1/50 174/38 |
| 5,167,541 | A * | 12/1992 | Alves | H01H 85/20 337/186 |
| 5,562,502 | A * | 10/1996 | Kourimsky | H01H 85/20 439/620.27 |
| 5,618,209 | A * | 4/1997 | Lin | H01H 85/205 439/620.26 |
| 6,430,054 | B1 | 8/2002 | Iwata | |
| 6,545,861 | B1 * | 4/2003 | Hayes | H02B 1/48 174/536 |
| 6,753,754 | B1 * | 6/2004 | Black | H01H 85/205 337/187 |
| 2002/0084271 | A1 * | 7/2002 | Sato | H02G 3/088 220/3.8 |
| 2002/0101724 | A1 | 8/2002 | Iwata | |
| 2004/0048142 | A1 * | 3/2004 | Marusak | B60R 16/0238 429/61 |
| 2005/0194167 | A1 * | 9/2005 | Kiyota | H02G 3/081 174/17 VA |
| 2006/0258186 | A1 * | 11/2006 | Egawa | H01R 13/518 439/76.2 |
| 2011/0147175 | A1 * | 6/2011 | Erickson | H01H 71/0264 200/51.09 |
| 2012/0103649 | A1 * | 5/2012 | Tagano | H01R 9/22 174/50 |

FOREIGN PATENT DOCUMENTS

| | | |
|---|---|---|
| JP | 2009-278800 A | 11/2009 |
| JP | 2012105508 A | 5/2012 |
| JP | 2012-228113 A | 11/2012 |

OTHER PUBLICATIONS

Communication dated Apr. 4, 2017, from the Japanese Patent Office in counterpart application No. 2013-184985.

Communication dated Jun. 13, 2017 from the Japanese Patent Office in counterpart Application No. 2013-184985.

* cited by examiner

ELECTRIC CONNECTION BOX

CROSS-REFERENCE TO RELATED APPLICATION

This application is a continuation application of International Application PCT/JP2014/072986, filed on Sep. 2, 2014, and designating the U.S., the entire contents of which are incorporated herein by reference.

BACKGROUND OF THE INVENTION

1. Field of the Invention

The present invention relates to an electric connection box that is mounted on an automobile and mainly distributes power.

2. Description of the Related Art

Electric connection boxes to be mounted on automobiles have various structures. Examples of the structures include the structure illustrated in FIG. 5. An electric connection box 301 illustrated in FIG. 5 includes a frame 302, an upper cover 303 that covers the upper surface of the frame 302, a lower cover 304 that covers the lower surface of the frame 302, and a plurality of blocks that are attached in the frame 302. Out of the plurality of blocks, a reference sign 305 is given to a block disposed at a position along the peripheral wall of the frame 302.

Components such as a relay, a fuse, and a bus bar are attached to the plurality of blocks. Electric wires 309 are connected to these components. The electric wires 309 are drawn from the lower surfaces of the respective blocks toward the lower cover 304 side.

In the electric connection box 301, when the lower cover 304 is attached to the frame 302, the electric wires 309 may be caught between the frame 302 and the lower cover 304. The electric wires 309 that are drawn from the block 305 disposed at the position along the peripheral wall of the frame 302, in particular, tend to be caught between the frame 302 and the lower cover 304.

Japanese Patent Application Laid-open No. 2001-211528 discloses an electric connection box (31) in which a wire bundle member (37) is fitted to a frame (connection box main body 33) to define paths of electric wires (41) before a lower cover (under cover 35) is attached, in order to prevent the electric wires from being caught between the frame and the lower cover.

As described above, in the electric connection box 301 illustrated in FIG. 5, when the lower cover 304 is attached to the frame 302, the electric wires 309 may be caught between the frame 302 and the lower cover 304. As in the electric connection box of Japanese Patent Application Laid-open No. 2001-211528, the problem can be solved by providing a component specifically for preventing electric wires from being caught. In return for this advantage, a new problem arises in that components count and assembly man-hours are increased, which also increases cost.

SUMMARY OF THE INVENTION

It is an object of the present invention is to provide an electric connection box capable of preventing an electric wire from being caught with a low components count.

An electric connection box according to one aspect of the present invention includes a frame; a lower cover configured to cover a lower surface of the frame; and at least one block configured to be attached in the frame and disposed at a position along a peripheral wall of the frame, wherein an electric wire that is connected to a component attached to the block is drawn horizontally from a lower surface side of the block toward inside the frame and the drawn electric wire proceeds toward a direction in which the electric wire has been drawn.

Further, according to another aspect of the present invention, when a plurality of the blocks are arranged in a height direction along the peripheral wall of the frame, it is desirable that an electric wire that is drawn from a lowermost block is drawn horizontally from the block toward inside the frame.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
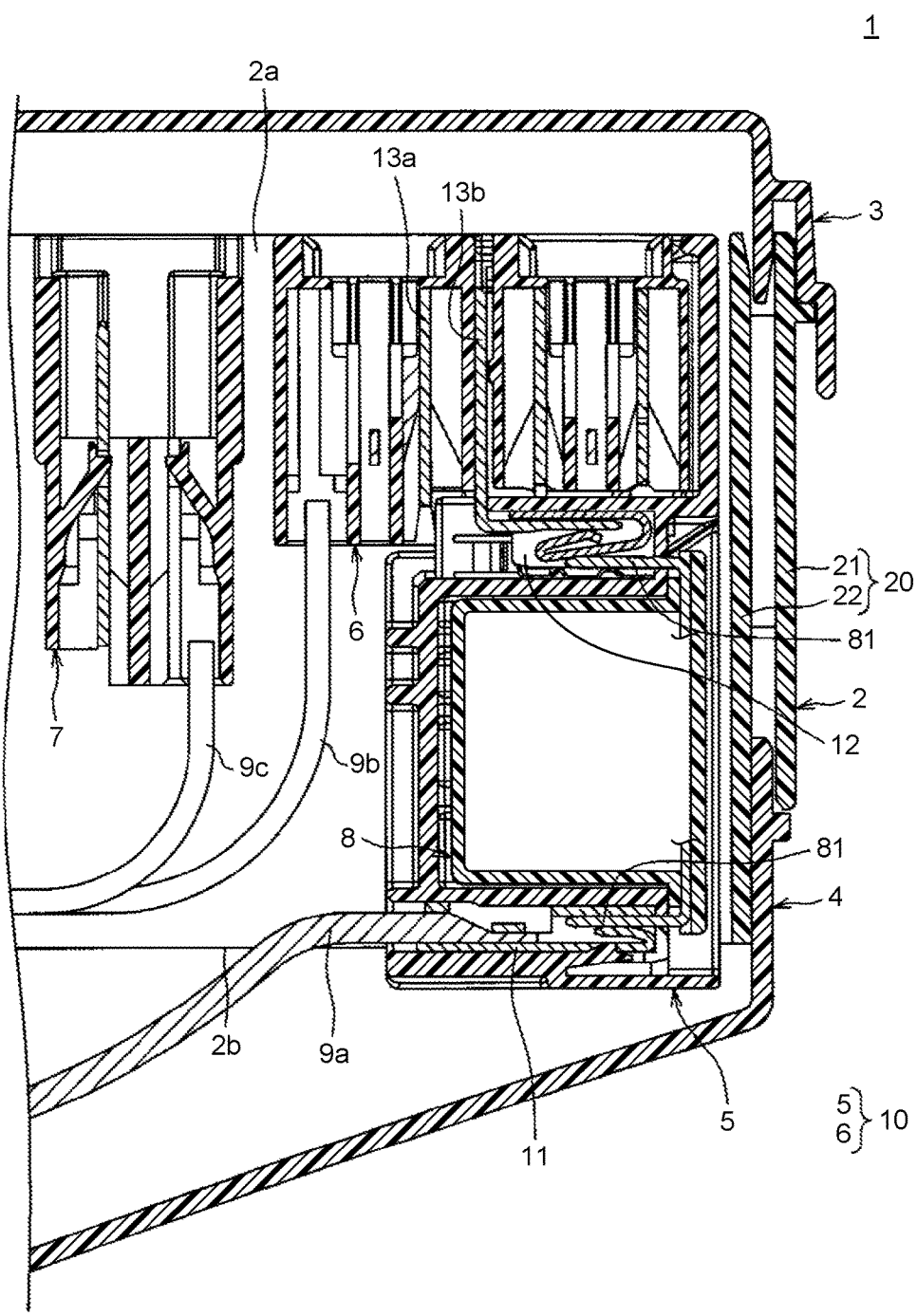
FIG. 1 is a sectional diagram of an electric connection box according to an embodiment of the present invention.
Figure 2:
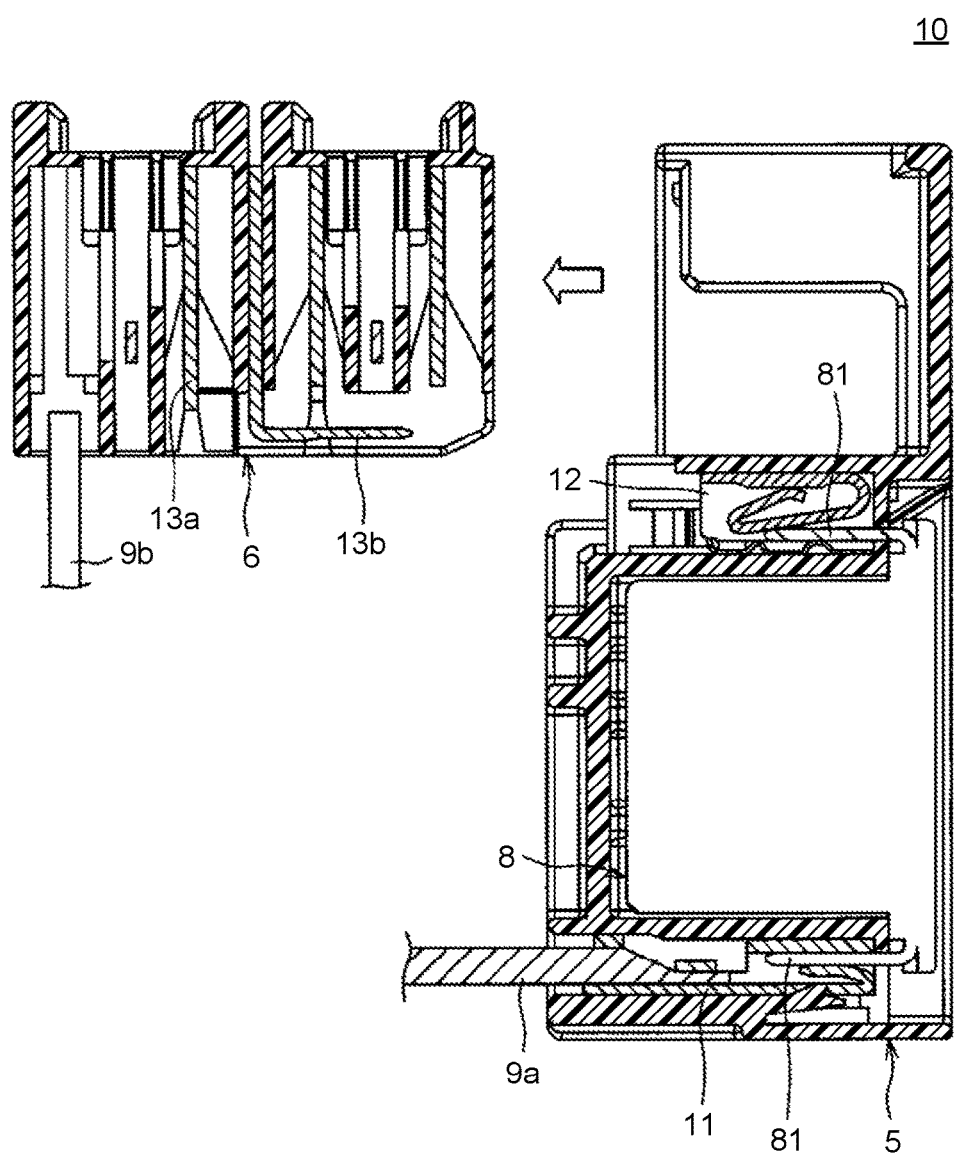
FIG. 2 is an exploded sectional diagram of a block assembly illustrated in FIG. 1.
Figure 3:
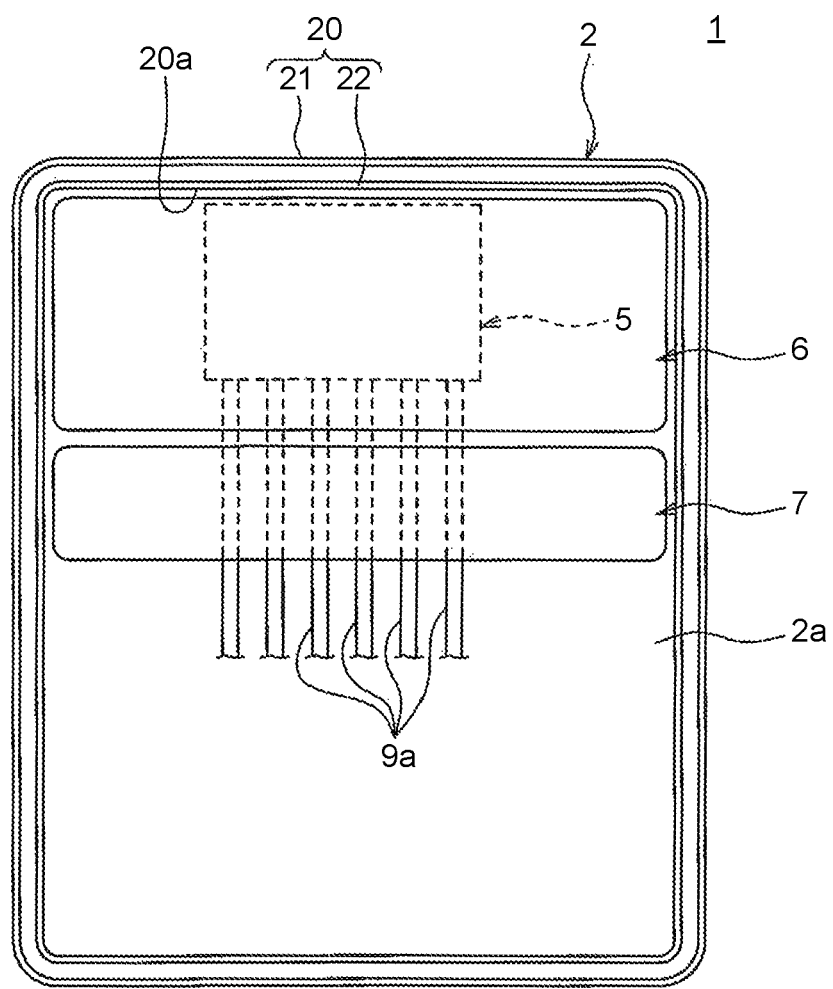
FIG. 3 is a schematic diagram schematically illustrating the upper surface of a frame of the electric connection box illustrated in FIG. 1.

The following describes an "electric connection box" according to an embodiment of the present invention with reference to FIG. 1 to FIG. 3. An electric connection box 1 illustrated in FIG. 1 to FIG. 3 is mounted on an automobile and mainly distributes power. The electric connection box 1 includes a frame 2, an upper cover 3 that covers an upper surface 2a of the frame 2, a lower cover 4 that covers a lower surface 2b of the frame 2, a plurality of blocks 5, 6, and 7 that are attached in the frame 2, and a plurality of components that are attached to these blocks 5, 6, and 7. The frame 2, the upper cover 3, the lower cover 4, and the blocks 5, 6, and 7 are made of synthetic resins. In FIG. 1 and FIG. 2, various components accommodated in the relay main body of a relay 8 are not illustrated.

The frame 2 includes a frame-shaped peripheral wall 20. The peripheral wall 20 has a double wall structure constructed of an outer side wall 21 and an inner side wall 22.

The blocks 5, 6, and 7 are formed separately from one another. To the block 5, the relay 8 and a relay terminal 12 are attached. The relay terminal 12 is electrically connected to one terminal part 81 of the relay 8. A terminal 11 connected to an end of one of electric wires 9a is electrically connected to the other terminal part 81 of the relay 8. To the block 6, a plurality of fuses (not illustrated) and a plurality of bus bars 13a and 13b are attached. A terminal (not illustrated) connected to an end of one of electric wires 9b is electrically connected to one terminal part of respective one of the fuses. To the block 7, a plurality of fuses (not illustrated) and a bus bar are attached. A terminal (not illustrated) connected to an end of one of electric wires 9c is electrically connected to one terminal part of respective one of the fuses.

The blocks 5 and 6 are arranged in the height direction along the peripheral wall 20 of the frame 2. The block 6 is disposed on the upper surface 2a side, while the block 5 is disposed on the lower surface 2b side. The block 7 is disposed closer to the inner side of the frame 2 than the blocks 5 and 6 are. The block 7 is also disposed closer to the upper surface 2a side than the block 5 is.

The blocks 5 and 6 are united with each other to constitute a block assembly 10, as illustrated in FIG. 2. The united blocks 5 and 6 are then attached in the frame 2. By uniting the blocks 5 and 6 with each other, the above relay terminal 12 electrically connects the one terminal part 81 of the relay 8 attached to the block 5 to the bus bar 13b attached to the block 6.

Out of the electric wires 9a, 9b, 9c that are drawn from the blocks 5, 6, and 7, respectively, the electric wires 9a that are disposed at a position along the peripheral wall 20 of the frame 2 and also drawn from the lowermost block 5 are drawn horizontally from the block 5 toward inside the frame 2. For the electric wires 9a, as illustrated in FIG. 1, only the portion in the block 5 and the portion close to the block 5 need to be horizontal and the portion away from the block 5 may hang downward. As illustrated in FIG. 3, the electric wires 9a intersect a surface 20a on the upper side (upper side of the page of FIG. 3) of the peripheral wall 20 and are also separated from all surfaces of the peripheral wall 20. The electric wires 9b and 9c that are drawn from the other blocks 6 and 7 are drawn from the lower surfaces of the blocks 6 and 7 toward the lower cover 4 side. The block 5 corresponds to the "block from which an electric wire is drawn horizontally toward inside the frame". "Downward" refers to the lower cover 4 side when viewed from the frame 2. "Upward" refers to the upper cover 3 side when viewed from the frame 2. "Horizontal(ly)" refers to a direction orthogonal to the stacking direction (height direction described above) of the block 5 and the block 6 after being attached.

When the blocks 5 and 6 are formed as an integrated block, the electric wires 9a and 9b are drawn from the integrated block, and out of the electric wires 9a and 9b, the electric wires 9a that are drawn from the lowermost position are drawn horizontally from the integrated block toward inside the frame 2. The integrated block corresponds to the "block from which an electric wire is drawn horizontally toward inside the frame".

As described above, the electric connection box 1 has such a structure that draws the electric wires 9a located close to the portion at which the frame 2 and the lower cover 4 mate with each other horizontally toward inside the frame 2 in the direction opposite to the mating portion. Thus, the electric wires 9a can be prevented from being caught between the frame 2 and the lower cover 4 without using a dedicated member for catching prevention.

In the present invention, the above electric wires 9b may be drawn horizontally from the block 6 toward inside the frame 2. In the above embodiment, however, the block 5 below the block 6 is interposed between the electric wires 9b and the peripheral wall 20, and the electric wires 9b are less likely to be caught between the frame 2 and the lower cover 4. Thus, the electric wires 9b are drawn toward the lower cover 4 side.

Figure 4:
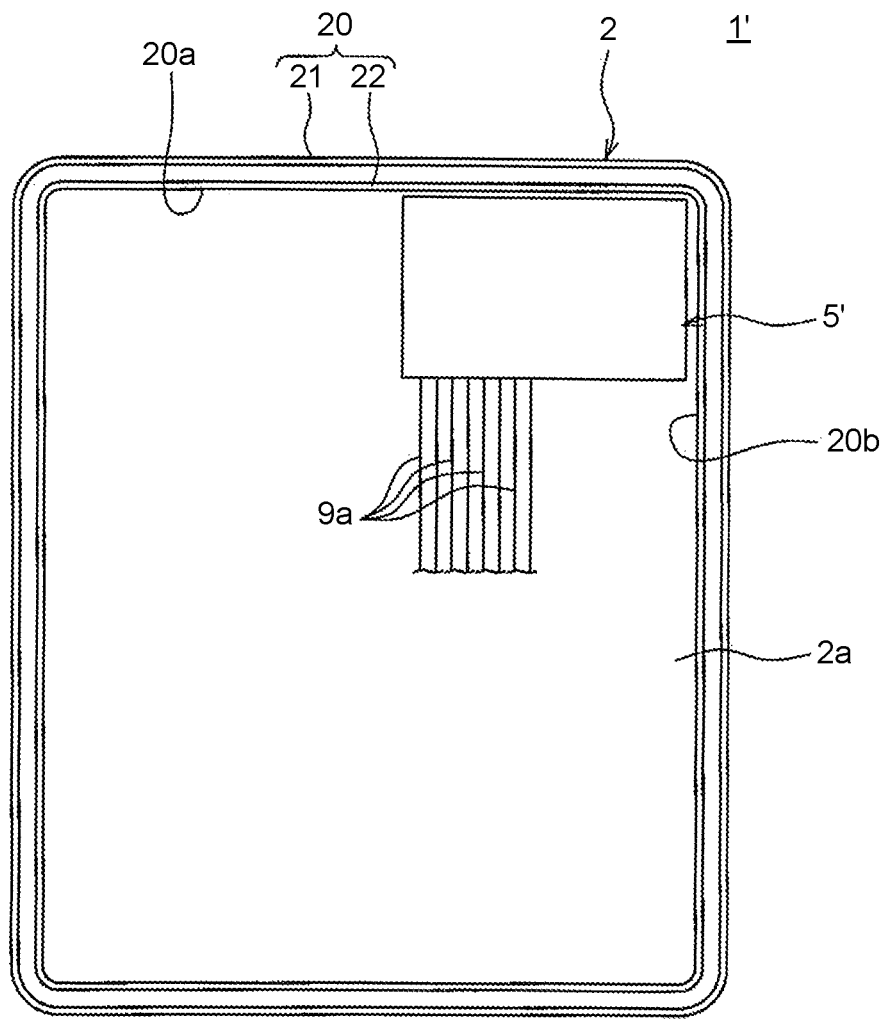
FIG. 4 is a schematic diagram illustrating a modification of the electric connection box illustrated in FIG. 3.
Figure 5:
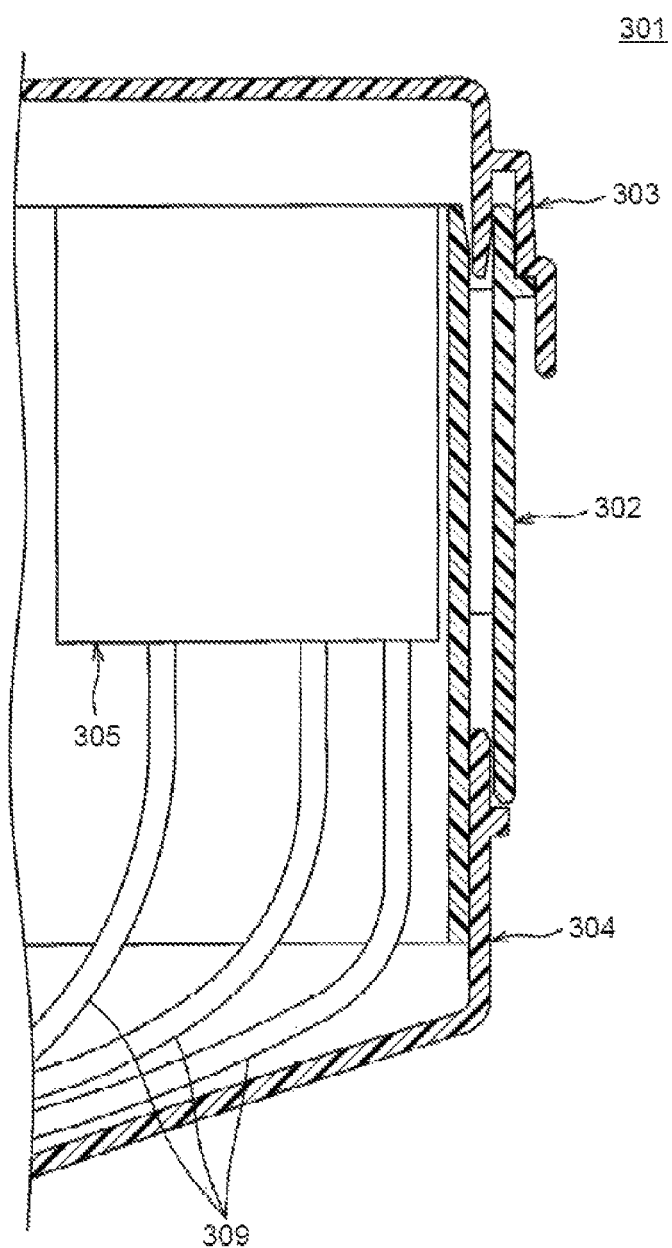
FIG. 5 is a sectional diagram of a conventional electric connection box.

FIG. 4 is a schematic diagram illustrating a modification of the electric connection box 1 illustrated in FIG. 3. In an electric connection box 1' illustrated in FIG. 3, a block 5' is attached to a corner of the frame 2. In other words, the block 5' is disposed at a position along two surfaces of the peripheral wall 20. The electric wires 9a intersect the surface 20a at the upper side (upper side of the page of FIG. 4) of the peripheral wall 20 and are also parallel to a surface 20b on the right side (right side of the page of FIG. 4) of the peripheral wall 20. Also in such a case, the electric wires 9a are separated from all surfaces of the peripheral wall 20. Consequently the electric connection box 1' can prevent the electric wires 9a from being caught between the frame 2 and the lower cover 4 (refer to FIG. 1).

Note that the above embodiment is merely presented in a representative form of the present invention, and thus is not intended to limit the scope of the present invention. In other words, the embodiment may be modified in various other forms without departing from the scope of the present invention.

In the electric connection box according to the present invention, the electric wire is drawn horizontally from the block toward inside the frame so that the electric wire can be prevented from being caught between the frame and the lower cover. The electric connection box can thus prevent an electric wire from being caught with a low components count.

In the electric connection box, when a plurality of electric wires are drawn from the block, an electric wire that is drawn from the lowermost position and is most likely to be caught can be prevented from being caught between the frame and the lower cover, by drawing the wire horizontally from the block toward inside the frame. The electric connection box can thus prevent an electric wire from being caught with a low components count.

In the electric connection box, when the blocks are arranged in the height direction along the peripheral wall of the frame, an electric wire that is drawn from the lowermost block and is most likely to be caught can be prevented from being caught between the frame and the lower cover, by drawing the wire horizontally from the block toward inside the frame. The electric connection box can thus prevent an electric wire from being caught with a low components count.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electric connection box comprising:
   a frame;
   a lower cover configured to cover a lower surface of the frame; and
   a plurality of blocks configured to be attached in the frame and disposed at a position along a peripheral wall of the frame, the plurality of blocks being arranged in a vertical direction so as to include an uppermost block and a lowermost block, each block having a component attached thereto, wherein
   a first electric wire that is connected to the component attached to the lowermost block is drawn horizontally from a lower surface side of the block as the first electric wire exits the block toward inside the frame and the drawn first electric wire proceeds toward a direction in which the first electric wire has been drawn, and
   a second electric wire that is connected to the component attached to the uppermost block is drawn vertically from a lower surface side of the uppermost block as the second electric wire exits the uppermost block toward inside the frame.

2. The electric connection box according to claim 1, wherein an upper cover covers an upper surface of the frame.

3. The electric connection box according to claim 2, wherein the frame, the upper cover, the lower cover, and the plurality of blocks are made of materials that include synthetic resins.

4. The electric connection box according to claim 1, wherein the peripheral wall has a double wall structure constructed of an outer side wall and an inner side wall.

5. The electric connection box according to claim 1, further comprising:

a relay and a relay terminal attached to at least one of the plurality of blocks, wherein the relay terminal is electrically connected to one terminal part of the relay.

6. The electric connection box according to claim 5, wherein a terminal connected to an end of at least one of the first electric wire and the second electric wire is electrically connected to other terminal part of the relay.

7. The electric connection box according to claim 1, further comprising:

at least one fuse and at least one bus bar attached to at least one of the plurality of blocks, wherein a terminal connected to an end of at least one of the first electric wire and the second electric wire is electrically connected to one terminal part of respective one of the at least one fuse.

8. The electric connection box according to claim 1, wherein the lowermost block is disposed on the lower surface of the frame.

9. The electric connection box according to claim 1, wherein the uppermost block is disposed on an upper surface of the frame.

10. An electric connection box comprising:

a frame;

an upper cover configured to cover an upper surface of the frame;

a lower cover configured to cover a lower surface of the frame; and at least one block configured to be attached in the frame and disposed at a position along a peripheral wall of the frame, wherein an electric wire that is connected to a component attached to the block is drawn horizontally from the block toward inside the frame.

* * * * *